(12) United States Patent
Combs

(10) Patent No.: US 11,402,121 B2
(45) Date of Patent: Aug. 2, 2022

(54) INSULATED REGISTER BOX WITH BOOT RAIL ADAPTOR

(71) Applicant: STERLING CUSTOM SHEET METAL, INC., Magnolia, TX (US)

(72) Inventor: Sterling Kidd Combs, Magnolia, TX (US)

(*) Notice: Subject to any disclaimer, the term of this patent is extended or adjusted under 35 U.S.C. 154(b) by 326 days.

(21) Appl. No.: 16/005,235

(22) Filed: Jun. 11, 2018

(65) Prior Publication Data

US 2018/0320921 A1 Nov. 8, 2018

Related U.S. Application Data

(63) Continuation-in-part of application No. 15/703,436, filed on Sep. 13, 2017, now Pat. No. 10,648,695, (Continued)

(51) Int. Cl.
*F24F 13/08* (2006.01)
*F24F 13/02* (2006.01)
(Continued)

(52) U.S. Cl.
CPC ........ *F24F 13/084* (2013.01); *F24F 13/0209* (2013.01); *F24F 13/0263* (2013.01);
(Continued)

(58) Field of Classification Search
CPC .. F24F 13/0263; F24F 13/084; F24F 13/0245; F24F 13/0254; F24F 13/0281; F24F 13/22; F24F 13/0209
(Continued)

(56) References Cited

U.S. PATENT DOCUMENTS 1,063,672 A * 6/1913 Flannery ................. F16L 1/038
405/155
1,156,885 A * 10/1915 Caine ........................ G09F 7/18
248/218.4
(Continued)

FOREIGN PATENT DOCUMENTS

JP H1047741 A * 2/1998 .......... F24F 13/0209

OTHER PUBLICATIONS

M&M Manufacturing Company (MMMC) "Install Boots and Boxes Quickly with Snap-On Rails" included as "MMMC_Snap_On_Rail_Installation_2006.pdf" (Year: 2006).*
(Continued)

*Primary Examiner* — Edelmira Bosques
*Assistant Examiner* — Frances F. Hamilton
(74) *Attorney, Agent, or Firm* — Egbert, McDaniel & Swartz, PLLC

(57) ABSTRACT

An insulated register box apparatus with a boot rail adapter has a register box, an insulating material affixed within the register box, a rail affixed to a side panel of the register box, and a rail guide having a slot that receives a section of the rail therein. The rail guide is adapted to be affixed to a supporting surface. The rail is affixed to at least one of the side panels of the register box. The rail is slidable relative to the rail guide. The register box has a plurality of side panels and a duct that opens to an interior of the plurality of side panels. The insulating material extends inwardly of the plurality of side panels.

1 Claim, 7 Drawing Sheets

Related U.S. Application Data which is a continuation-in-part of application No. 15/439,454, filed on Feb. 22, 2017, now Pat. No. 10,309,682, which is a continuation-in-part of application No. 14/668,079, filed on Mar. 25, 2015, now Pat. No. 9,951,969.

(51) Int. Cl.
*B29C 44/18* (2006.01)
*B29L 23/00* (2006.01)
*B29K 75/00* (2006.01)

(52) U.S. Cl.
CPC ........ *B29C 44/188* (2013.01); *B29K 2075/00* (2013.01); *B29L 2023/00* (2013.01); *F24F 13/0245* (2013.01)

(58) Field of Classification Search
USPC ........................................................ 454/330
See application file for complete search history.

(56) References Cited

U.S. PATENT DOCUMENTS

| | | | | |
|---|---|---|---|---|
| 1,756,361 A | * | 4/1930 | Johnson | H02G 3/126 220/3.4 |
| 2,038,389 A | * | 4/1936 | Siebenlist | F16L 9/02 138/167 |
| 2,254,558 A | * | 9/1941 | Williams | B21D 39/035 24/23 EE |
| 2,286,118 A | * | 6/1942 | Sleeth | F16L 3/006 248/58 |
| 2,342,965 A | * | 2/1944 | Palmer | F24F 13/08 454/331 |
| 2,528,418 A | * | 10/1950 | Buckels | H02G 3/126 248/57 |
| 2,566,558 A | * | 9/1951 | De Roo | F24F 13/08 454/331 |
| 2,661,677 A | * | 12/1953 | Lingelbach | E06B 7/08 454/331 |
| 2,809,002 A | * | 10/1957 | Rudolph | H02G 3/126 248/57 |
| 3,162,413 A | * | 12/1964 | Hexdall | F16L 3/00 248/71 |
| 3,163,386 A | * | 12/1964 | Collins | F16L 3/00 248/71 |
| 3,251,382 A | * | 5/1966 | Tatsch | F24F 13/0263 428/36.5 |
| 3,327,606 A | * | 6/1967 | Little | F24F 13/06 454/298 |
| 3,407,640 A | * | 10/1968 | Lipp | B21D 39/02 72/181 |
| 3,425,655 A | * | 2/1969 | Cogdill | H02G 3/381 248/343 |
| 3,559,560 A | * | 2/1971 | Trahan | F24F 13/06 248/343 |
| 3,597,889 A | * | 8/1971 | Lo Nigro | H02G 3/125 52/28 |
| 3,609,338 A | * | 9/1971 | Kripp | F21V 21/04 362/366 |
| 3,701,194 A | * | 10/1972 | Widman | B21D 39/02 29/278 |
| 3,858,540 A | * | 1/1975 | Berg | B21D 39/02 138/163 |
| 4,228,980 A | * | 10/1980 | Beauchamp | A47H 1/18 16/87.2 |
| 4,280,536 A | * | 7/1981 | Gnant | F16L 9/003 138/147 |
| 4,294,476 A | * | 10/1981 | Nash | F16L 41/08 285/424 |
| 4,336,575 A | * | 6/1982 | Gilman | F21V 21/04 248/27.1 |
| 4,621,661 A | * | 11/1986 | Greiner | F24F 13/0209 29/432 |
| 4,658,490 A | * | 4/1987 | Czelusniak | E04F 21/1855 29/271 |
| 4,723,747 A | * | 2/1988 | Karp | F21V 21/04 248/298.1 |
| 4,760,981 A | * | 8/1988 | Hodges | F16L 3/006 248/57 |
| 4,972,339 A | * | 11/1990 | Gabrius | F21V 21/04 248/343 |
| 5,029,794 A | * | 7/1991 | Wolfe | F21V 21/04 248/343 |
| 5,281,187 A | * | 1/1994 | Whitney, Jr. | F24F 13/068 248/343 |
| 5,690,423 A | * | 11/1997 | Hentz | F21S 8/02 248/302 |
| 5,928,078 A | * | 7/1999 | Moore | F24F 13/084 285/341 |
| 5,957,506 A | * | 9/1999 | Stepp | F24F 13/0263 285/47 |
| 5,957,574 A | * | 9/1999 | Hentz | F21S 8/02 248/302 |
| 5,975,146 A | * | 11/1999 | Lardillat | F16L 59/147 138/149 |
| 5,996,644 A | * | 12/1999 | Iizuka | F24F 13/0209 138/163 |
| 6,033,098 A | * | 3/2000 | Hentz | B62J 6/00 248/228.7 |
| 6,076,788 A | * | 6/2000 | Akiyama | E04B 9/006 248/200.1 |
| 6,286,265 B1 | * | 9/2001 | Rinderer | E04B 9/006 52/28 |
| 6,463,961 B1 | * | 10/2002 | Iizuka | F24F 13/0254 138/155 |
| 6,488,247 B1 | * | 12/2002 | Gonzalez | F24F 13/0209 248/220.1 |
| 6,519,791 B2 | * | 2/2003 | Randolph | E03C 1/021 4/695 |
| 6,797,653 B2 | * | 9/2004 | Fay | D04H 1/46 442/136 |
| 6,814,106 B1 | * | 11/2004 | Iizuka | F24F 13/0254 138/163 |
| 6,967,284 B1 | * | 11/2005 | Gretz | H02G 3/125 174/50 |
| 7,140,960 B2 | * | 11/2006 | Pilger | F24F 13/06 454/331 |
| D537,934 S | * | 3/2007 | Crook | D23/393 |
| 7,624,762 B2 | * | 12/2009 | Cohen | B32B 15/08 138/149 |
| 7,645,189 B2 | * | 1/2010 | Pilger | F24F 13/06 248/57 |
| 7,673,841 B2 | * | 3/2010 | Wronski | F16M 13/027 248/343 |
| 7,699,078 B1 | * | 4/2010 | Husmann, Jr. | F24F 13/0245 138/114 |
| 7,735,795 B2 | * | 6/2010 | Wronski | F21V 21/048 248/343 |
| 7,754,122 B2 | * | 7/2010 | Fay | D04H 1/46 264/122 |
| 7,874,539 B2 | * | 1/2011 | Wright | F04D 25/088 248/323 |
| 8,186,387 B2 | * | 5/2012 | Wadsworth | F16L 55/0336 138/149 |
| 8,240,630 B2 | * | 8/2012 | Wronski | F16M 13/027 248/343 |
| 8,622,361 B2 | * | 1/2014 | Wronski | F21V 21/048 248/343 |
| 8,695,644 B2 | * | 4/2014 | Rowan | F16L 9/003 138/149 |
| 8,863,967 B2 | * | 10/2014 | Suzuki | B32B 7/12 206/524.1 |
| 8,939,418 B2 | * | 1/2015 | Green | F21V 21/04 248/200.1 |
| 9,004,435 B2 | * | 4/2015 | Wronski | F21V 21/048 248/343 |
| 9,060,607 B1 | * | 6/2015 | Canales | A47F 5/0006 |
| 9,114,579 B2 | * | 8/2015 | Lanciaux | B29D 23/001 |
| 9,209,612 B2 | * | 12/2015 | Evans | H02G 3/125 |

(56) References Cited

U.S. PATENT DOCUMENTS

| | | | |
|---|---|---|---|
| 9,303,812 B2* | 4/2016 | Green | F16M 13/022 |
| 9,476,607 B2* | 10/2016 | Gray | F24F 13/0263 |
| 9,528,261 B2* | 12/2016 | Sandoe | E04B 1/7662 |
| 9,689,541 B2* | 6/2017 | Wronski | F21V 21/04 |
| 9,696,021 B2* | 7/2017 | Wronski | F21V 21/048 |
| 9,732,904 B1* | 8/2017 | Wronski | E04B 9/006 |
| 9,739,464 B2* | 8/2017 | Wronski | F21S 8/026 |
| 9,790,340 B2* | 10/2017 | Sobotka | F24F 7/00 |
| 9,840,050 B2* | 12/2017 | Lanciaux | B29D 23/001 |
| 9,840,051 B2* | 12/2017 | Lanciaux | B29D 23/001 |
| 9,951,969 B2* | 4/2018 | Combs | F24F 13/082 |
| 9,982,806 B2* | 5/2018 | Rowan | F16L 9/003 |
| 10,012,366 B2* | 7/2018 | Belmonte | F21V 21/047 |
| 10,184,595 B2* | 1/2019 | Sakakibara | B21D 26/033 |
| 10,309,682 B2* | 6/2019 | Combs | F24F 13/0263 |
| 10,480,761 B2* | 11/2019 | Belmonte | F21V 21/048 |
| 10,584,837 B2* | 3/2020 | O'Brien | F21V 21/22 |
| 10,634,298 B2* | 4/2020 | O'Brien | F21V 21/22 |
| 10,648,695 B2* | 5/2020 | Combs | B29C 41/20 |
| 2001/0003993 A1* | 6/2001 | Faverio, IV | F24F 13/0263 138/149 |
| 2003/0068943 A1* | 4/2003 | Fay | F16L 59/029 442/76 |
| 2004/0130154 A1* | 7/2004 | Stepp | F16L 13/163 285/424 |
| 2004/0218975 A1* | 11/2004 | Walsh | F16L 23/14 403/397 |
| 2005/0090168 A1* | 4/2005 | Fay | F24F 13/0263 442/85 |
| 2005/0230589 A1* | 10/2005 | Wronski | F21V 21/04 248/323 |
| 2005/0247842 A1* | 11/2005 | Wronski | F21V 21/04 248/323 |
| 2008/0045137 A1* | 2/2008 | Rosal | F24F 13/0245 454/292 |
| 2009/0133347 A1* | 5/2009 | Wadsworth | F16L 59/026 52/309.1 |
| 2013/0130612 A1* | 5/2013 | Penlesky | F24F 7/06 29/428 |
| 2014/0261846 A1* | 9/2014 | Lanciaux | B29C 53/04 138/141 |
| 2014/0271972 A1* | 9/2014 | Lanciaux | B29C 53/04 425/388 |
| 2014/0290836 A1* | 10/2014 | Lanciaux | B32B 15/046 156/217 |
| 2015/0204573 A1* | 7/2015 | Gray | B32B 37/14 29/416 |
| 2016/0282009 A1* | 9/2016 | Combs | F24F 13/06 |
| 2016/0303840 A1* | 10/2016 | Gray | F24F 13/0263 |
| 2016/0305684 A1* | 10/2016 | Gray | B32B 37/14 |
| 2017/0122466 A1* | 5/2017 | Sakakibara | F16L 9/21 |
| 2017/0191696 A1* | 7/2017 | Combs | B29C 41/20 |
| 2018/0003407 A1* | 1/2018 | Combs | F24F 13/084 |
| 2018/0099465 A1* | 4/2018 | Lanciaux | B29D 23/001 |
| 2018/0187919 A1* | 7/2018 | Combs | B29C 41/20 |
| 2018/0363942 A1* | 12/2018 | Combs | B29C 44/18 |
| 2019/0126948 A1* | 5/2019 | Yokoyama | B61D 27/009 |

OTHER PUBLICATIONS

Stan Button Punch Snap Lock-former product page; included as "Stan_Button_Punch_Snap_Lock_former.pdf" (Year: 2017).*

AireTechnologies "Series 50 w/Boot Installation Video" located at https://www.youtube.com/watch?v=zq7Ro6w18GE with screenshots included here as "series_50_install_2013.pdf" (Year: 2013).*

RAMS Auxiliary Machine 20 28 Gauge product page (© 2016 by Madison Machinery with 2014 embedded video) https://www.madisonmachinetool.com/store/p4/RAMS_Auxiliary_Machine_20-28_Gauge.html?gclid=Cj0KCQjwzYGGBhCTARIsAHdMTQxgoHY93PatwFij4xZe6PYn_I99JRppgHoKO8IJ5jAChbq42OZAiRYaAq7zEALw_wcB28isee next (Year: 2014).*

RAMS reference included as "RAMS_Auxiliary_Machine 20-28_Gauge_with_youtube_2016.pdf" (Year: 2014).*

* cited by examiner

INSULATED REGISTER BOX WITH BOOT RAIL ADAPTOR

CROSS-REFERENCE TO RELATED APPLICATIONS

The present application is a continuation-in-part of U.S. patent application Ser. No. 15/703,436, filed on Sep. 13, 2017, and entitled "Insulated Register Box with Boot Rail Adapter", presently pending. U.S. patent application Ser. No. 15/703,436 was a continuation-in-part of U.S. patent application Ser. No. 15/439,454, filed on Feb. 22, 2017, and entitled "Process for Forming an Insulated Register Box", presently pending. U.S. patent application Ser. No. 15/439,454, is a continuation-in-part of U.S. patent application Ser. No. 14/668,079, filed Mar. 25, 2015, and entitled "Insulated Register Box and Method for Forming an Insulated Register Box", which issued as U.S. Pat. No. 9,951,969 on Apr. 24, 2018.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to ductwork for heating, ventilation and air-conditioning (HVAC) systems. More particularly, the present invention relates to register boxes as used with such systems. More particularly, the present invention relates boot rail adapters that are used to secure the register box to supporting surfaces.

2. Description of Related Art Including Information Disclosed Under 37 CFR 1.97 and 37 CFR 1.98

To create the desired ambient conditions within a structure, a typical HVAC system is installed for circulating and/or conditioning air drawn from the interior of the structure and returned to the interior of the structure. A central unit or several units are located in or near the structure, each unit comprising a fan for air circulation and optionally comprising a heating, humidification, or cooling system for conditioning the air passing through the central unit.

To conduct air to and from each central unit, ducting is provided in the structure. The ducting includes supply-air ducts which provide conditioned air to the interior of the structure and are connected to the outlets of each central unit and return-air ducts which return air to each central unit and are connected to inlets of each central unit. Supply-air ducts typically terminate in supply-air register boxes mounted to the walls, the ceilings, or other surfaces within the interior, whereas return-air ducts typically begin at register boxes mounted to a surface within the interior, such as a wall, ceiling, or floor. There are usually many more register boxes for supplying air than for returning air, with those for returning air typically being substantially larger than those for supplying air.

To increase efficiency, building codes are being revised to require substantially airtight HVAC systems. In the past, a standard technique has been utilized for forming such sheet-metal register boxes. A form is cut from a rectangular, planar metal sheet. The form has cutouts for corners or other features to allow bending of the form into the desired shape. Cutouts define the height of the sides and an overlapping flap is formed by cutting a slot at each cut out. The sides are bent along bend lines to lie in intersecting planes so as to form an open-bottom, rectangular enclosure of a register box, with the vertical edges of the sides abutting the inside surfaces of the sides. The flap is folded around each corner that lies adjacent the outer surface of the side and then fastened to the side with rivets. In order to complete the register box, a circular duct connector or is connected to a circular cutout in the upper surface of the box. Prior art register boxes are also formed with abutting edges to form the enclosure. The abutting or overlapping edges may be fastened by adhering or by other fastening means, such as spot welding.

The method described above produces ducting enclosures that often leak conditioned air through the gaps between the edges at the corners, or, in the case of enclosures formed with multiple pieces, through the seams where the pieces are joined together. The prior-art method includes many labor-intensive steps to form the enclosures, including the cutting of the planar sheet and the fastening of the edges.

In order to achieve the requisite efficiency in compliance with building codes, insulation is used with such register boxes. The formation of the insulation of the register boxes has become somewhat of a problem. Since the boxes are conventionally made of sheet metal, such as galvanized steel or aluminum, the insulation must be applied to either or both the inside and outside of the register box either before or after it is installed. The cutting and fastening of the insulation to the box is tedious and time-consuming. As such, it is thereby rather expensive in terms of the cost of the insulation material and in terms of the amount of time required to properly insulate the register box.

The placement of insulation can be a time-consuming, hazardous, and tedious task. Typically, a large section of fibrous material requires a cutting into various shapes that fit within the interior of the register box. This fibrous material is then affixed to the walls on the inside of the register box by hand. Often, many steps are required so as to properly fit the insulation material within the register box. Furthermore, since fibrous material is being manually handled by workers, there can be exposure to airborne fibers. The cutting and fitting of the insulation material within the register box is extremely tedious and boring to workers.

In the past, various patents have issued relating to register boxes and to the insulating of such register boxes. For example, U.S. Pat. No. 3,985,158, issued on Oct. 12, 1976 to J. V. Felter, describes a box for mounting diffusers wherein the main body of the box is made of expanded plastic or similar material. One or more connection elements are molded within the walls of the box to provide for connection of the box to the building structure and to a duct and also to reinforce the box.

U.S. Pat. No. 4,735,235, issued on Apr. 5, 1988 to Anderson et al., discloses an insulated duct end system. The system includes duct assemblies and transition components for interconnecting the duct assemblies. Each duct assembly includes an insulated duct having a rigid sleeve within at least one end. Each sleeve includes an abutment ring and orifices in the ring for permitting air to flow into the insulated area to balloon the layer and improve its insulative effect.

U.S. Pat. No. 5,095,942, issued on Mar. 17, 1992 to G. C. Murphy, teaches a plastic self-insulating ductwork system. The system includes a distribution box which includes an upper portion having a plurality of walls and a bottom plate. The distribution box is joined to interconnecting duct lines by adapter conduits. The adapter conduits are adapted at one end for connection to an opening in the wall and are adapted at the other end for connection to an adjoining duct line. U.S. Pat. No. 5,219,403, issued on Jun. 15, 1993 the G. C. Murphy, discloses a similar type of self-insulating ductwork system as that of U.S. Pat. No. 5,095,942.

U.S. Pat. No. 5,658,196, issued on Aug. 19, 1997 to T. L. Swaim, provides an air duct diffuser for attachment to a ceiling grid. The diffuser includes a frame which mounts to the ceiling grid and a louver which mounts to the frame for directing diffused air within an associated airspace. A preformed composite housing of insulating material mounts to the frame and has punch-out duct openings of varying sizes.

U.S. Pat. No. 5,749,190, issued on May 12, 1998 to S. R. Williams, shows an HVAC register box having no welded or riveted corners and also a process for making such an HVAC register box. The register box is fabricated from a single sheet of material without cutting. The register box has superior rigidity and resistance to air leakage at the joints or corners.

U.S. Pat. No. 5,957,506, issued on Sep. 28, 1999 to M. D. Stepp, provides a sheet-metal insulated register box. The register box has an adjustable elbow fitting that is coupled directly to an air inlet panel of an air distribution register box by having roll-formed flange portions that are mated in interlocking, overlapping engagement with each other. The air inlet panel includes an outwardly flared coupling flange bordering an air inlet opening. The neck of the sheet-metal elbow includes a folded coupling flange that is dimensioned for interfitting, overlapping engagement with the outwardly-flared elbow coupling flange.

U.S. Patent Publication No. 2008/0014860, published on Jan. 17, 2008 to Heitman et al., discloses a method and apparatus for eliminating register boxes. A collar plate assembly interfaces with metal air ducts and is provided with at least one spring indentation ring to accept two or more locking springs. The locking springs are used to attach the ceiling register to the collar plate assembly. The collar plate assembly uses mounting rails that attach the assembly to either the ceiling or wall supports. A trim ring is inserted in the cutout that attaches between the collar in the ceiling so as to eliminate air leakage and so as to provide an essentially smooth flow of air from the supply duct to the inside of the structure.

U.S. Patent Publication No. 2004/0130154, published on Jul. 8, 2004 to Stepp et al., shows a substantially airtight register box for HVAC systems. The register box has a body formed from at least one planar sheet. The body has an inlet and outlet. At least one of the inlet and the outlet is formed by folding corners of the planar sheet to form planar sides that lie in intersecting planes. The enclosure is then mounted to a surface of an interior area of a structure and is connected to ducts for communicating air between the interior area at a central air-handler unit.

U.S. Patent Publication No. 2008/0045137, published on Feb. 21, 2008 F. Rosal, discloses an insulated plenum box for heating, ventilating and air conditioning duct systems. This plenum box has insulation sprayed onto either the inside or outside of the plenum box in order to match the R-value of the connecting insulated duct.

The configuration of the ductwork poses a problem for unskilled construction workers and is extremely time-consuming. Generally, this work involves fitting together preformed components that frequently differ in dimensions and require careful measuring and positioning during the installation process so that the components fit together. For example, a worker will commonly transpose the dimensions of the register box onto the area of the wall or ceiling opening to ascertain the dimensions of the opening to be cut. Alternately, the worker will select a standard-sized commercially available register box to fit into a pre-existing opening. Because any measurements can introduce inaccuracies, the possibility that the components will not fit together to provide support for the register box in the wall or ceiling opening or create gaps between the edges of the opening in the register box is a real concern. In those cases, another bracket must be brought to the site and used. Alternatively, the register box must be modified or register box replaced with a different size so that the components fit together and so that the register box is securely supported in the opening in the wall or ceiling.

Additionally, prior art boot systems often utilize fasteners, brackets and supports which apply fasteners to the structure of the a register box. The penetration of the structure of the register box can damage the register box. Furthermore, the structural integrity of the register box will be somewhat compromised by the penetration of the walls of the register box. As such, a need has developed so as to provide a boot rail adapter assembly which avoids the damaging of the register box while, at the same time, allowing flexibility in the installation of the register box.

In the past, various patents have issued with respect to boot rail adapters. For example, U.S. Pat. No. 4,760,981, issued on Aug. 2, 1988 to B. E. Hodges, discloses a boot hanger assembly. This hanger assembly supports ductwork. The hanger assembly has telescoping brackets for supporting the ductwork and a clip. The clip is adapted to slidably receive the telescoping hanger brackets. The clip is also adapted to mount the ductwork to the hanger brackets in a slidable fashion.

U.S. Pat. No. 6,652,375, issued on Nov. 25, 2003 to W. J. Donnelly, shows an air-conditioning register and boot assembly. A register mounting member is detachably connected to the boot member and a register face member is mounted on the mounting member to cover the front face thereof. The assembly is quickly and conveniently installed an opening in a floor, wall or ceiling by flexible securing clips mounted on upper edges of side or end walls of the mounting member. The securing clips have gripping formations which engage with similar formations on the face member to assist in retaining the face member to the mounting member.

U.S. Pat. No. 6,866,579, issued on Mar. 15 2005 to A. Pilger, describes a boot hanger mounting bracket that includes a boot hanger frame portion and a supporting member portion. The boot hanger mounting bracket is formed of a sturdy yet bendable material so that it can be configured and adjusted on-site. The boot hanger mounting bracket is secured to the building structure by securing a pair of boot hanger arms to the ceiling joists, wall studs or other supporting surface.

U.S. Pat. No. 8,944,397, issued on Feb. 3, 2015 to Brown et al., teaches a universal HVAC component mounting system. The mounting system defines a platform comprised of slidingly engaging rail sections. Each of the rail sections includes support brackets from which extend a receiving member or an inserting member configured to engage a receiving member. The platform sections include arms having channels and arms having glides. Each glide is configured to slidingly engage the channel of an adjacent platform section so as to allow the platform sections to adjust the effective length and width of the platform.

U.S. Patent Application Publication No. 2003/0177724, published on Sep. 25, 2003 to W. A. Botting, provides an adapter having a central body portion and a mount for connection to each of an HVAC register cover and a duct-engaging boot. A surface of the central body portion includes mounting apertures in which each is configured to accept a fastener so that the central body portion can be mounted to a support structure, such as a ceiling joist. The adapter includes a register cover mounting surface that is adjustable so that it can accommodate different-sized register covers. The adapter also includes a boot mounting surface coupled to the register cover mounting surface such that, upon engagement between the register cover mounting surface and the register cover and upon engagement between the boot mounting surface and the boot, fluid communication between the boot and the register cover is established.

U.S. Patent Application Publication No. 2005/0034407, published on Feb. 17, 2005 to Snyder et al., provides a support frame for a duct so as to hold the position of a vertically-disposed air duct within a wall between wall studs. The support frame defines an opening that receives the air duct. The support frame has a flange extending around the opening that engages the air duct. The support frame may include notched ends that receive the opposed wall studs to position the support frame with respect to the duct opening formed in the floor boards.

U.S. patent application Ser. No. 15/703,436, to the present Applicant, describes a register insulated register box with a boot rail adapter. This apparatus includes an insulating material affixed within the register box, a rail guide affixed to a side panel of the register box, and a rail having a section received in a slot of the rail guide. The rail is adapted to be affixed to a supporting surface, such as a joist. The rail guide is slidable relative to the rail. The rail guide is affixed to an exterior surface of the side panel.

Upon experimentation with the subject matter of U.S. patent application Ser. No. 15/703,436, the present Applicant found that it was possible, and sometimes practical, to reverse the orientation of the rail guide with respect to the rail. In certain circumstances, it was found to be easier to put the rail guide onto the joist and then put the rail onto the register box. As such, the present application was directed to the insulated register box with the boot rail adapter in which the rail guide is adapted to be affixed to a supporting surface and the rail is secured to the register box.

It is an object of the present invention to provide an insulated register box which minimizes air loss.

It is another object of the present invention to provide an insulated register box which improves the insulating rating of the register box.

It is another object of the present invention to provide a insulated register box in which the register box is fire-resistant.

It is another object of the present invention to provide an insulated register box which is compliant with national building codes.

It is another object of the present invention to provide an insulated register box which avoids the use of fibrous insulation.

It is a further object of the present invention to provide an insulated register box which improves the health and safety of workers that assemble the register box.

It is another object of the present invention to provide an insulated register box in which the formed register box is very energy efficient.

It is another object of the present invention to provide a process for forming a register box which allows inspectors to quickly ascertain that the register box is insulated.

It is another object of the present invention to provide an insulated register box with a boot rail adapter which allows the position of the register box to be adjusted.

It is another object of the present invention to provide an insulated register box with a boot rail adapter which allows the register box to be locked in position on the rails.

It is another object of the present invention to provide an insulated register box and a boot rail adapter which avoids the penetration of the material of the register box.

It is still another object of the present invention to provide an insulated register box with a boot rail adapter which can be quickly and easily assembled by unskilled personnel.

It is still a further object of the present invention to provide an insulated register box with a boot rail adapter which is easy to manufacture and relatively inexpensive.

These and other objects and advantages of the present invention will become apparent from a reading of the attached specification and appended claims.

BRIEF SUMMARY OF THE INVENTION

The present invention is an apparatus that comprises a register box having a plurality of side panels and a duct opening to an interior of the plurality of side panels, an insulating material affixed to the plurality of side panels and extending inwardly of the plurality of side panels, a rail guide defining a slot that extends longitudinally along the rail guide, and a rail having a section received in the slot of the rail guide. The rail guide is adapted to be affixed to a supporting surface. The rail is affixed to at least one of the plurality of side panels.

The rail guide is slidable relative to the rail. The rail is affixed to an exterior surface of the side panel. The rail is affixed to the exterior surface of the side panel without fasteners. The rail includes a first rail affixed to a first side panel of the plurality of side panels and a second rail affixed to a second side panel of the plurality of side panels. The first side panel is on an opposite side of the register box from the second side panel.

The rail guide includes a first rail guide and a second rail guide. The first rail guide receives the first rail therein. The second rail guide receives the second rail therein. The rail guide comprises a first surface adapted to be affixed to the underlying surface, a second surface extending inwardly from a side of the first surface, and a third surface extending in spaced relationship to the second surface. The third surface has an inwardly turned edge that is inwardly turned in a direction toward the second surface. The slot of the rail guide is defined by the second and third surfaces. The section of the rail is received between the second and third surfaces. The section of the rail has at least one projection extending toward the third surface of the rail guide. This projection is cooperative with the inwardly turned edge so as to lock the rail guide to the rail.

The support surface is a joist. The rail guide is affixed to the joist. The register box has a portion extending away from the joist. The joist comprises a first joist and a second joist extending in parallel relation to each other. The rail guide comprises a first guide rail guide and a second rail guide. The first rail guide is affixed to the first joist and to the second joist. The second rail guide is affixed to the first joist and to the second joist in parallel relationship to the first rail guide. The rail comprises a first rail and a second rail. The first rail is received by the first rail guide. The second rail is received by the second rail guide. The insulating material is an expanded polymeric material. The rail is affixed to the side panel by a clinch lock.

The present invention is also a method for positioning a register box upon a supporting surface. This method includes the steps of: (1) affixing a rail to an exterior surface of the register box; (2) inserting a section of the rail into a slot of a rail guide such that the rail is secured to the rail guide; and (3) fastening the rail guide to the supporting surface such that the register box extends away from the supporting surface. This method further includes sliding the section of the rail longitudinally along the slot of the rail guide so as to position the register box in a desired position with respect to the sporting surface. The step of affixing includes attaching the rail to the exterior surface of the register box without penetrating the material of the register box.

In the method of the present invention, the supporting surface is a first joist and a second joist. The step of fastening includes affixing the rail guide to the first joist such that the register box is positioned between the first and second joists. The step of fastening includes a fixing the first rail guide to the first and second joists such that the first rail guide extends between the first and second joists, and affixing the second rail guide to this first and second joists such that the second rail guide extends between the first and second joists in parallel relationship to the first rail guide. The step of inserting include snap-fitting the section of the rail into the slot of the rail guide such that the rail guide is locked upon the rail.

This foregoing Section is intended to describe, with particularity, the preferred embodiment of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
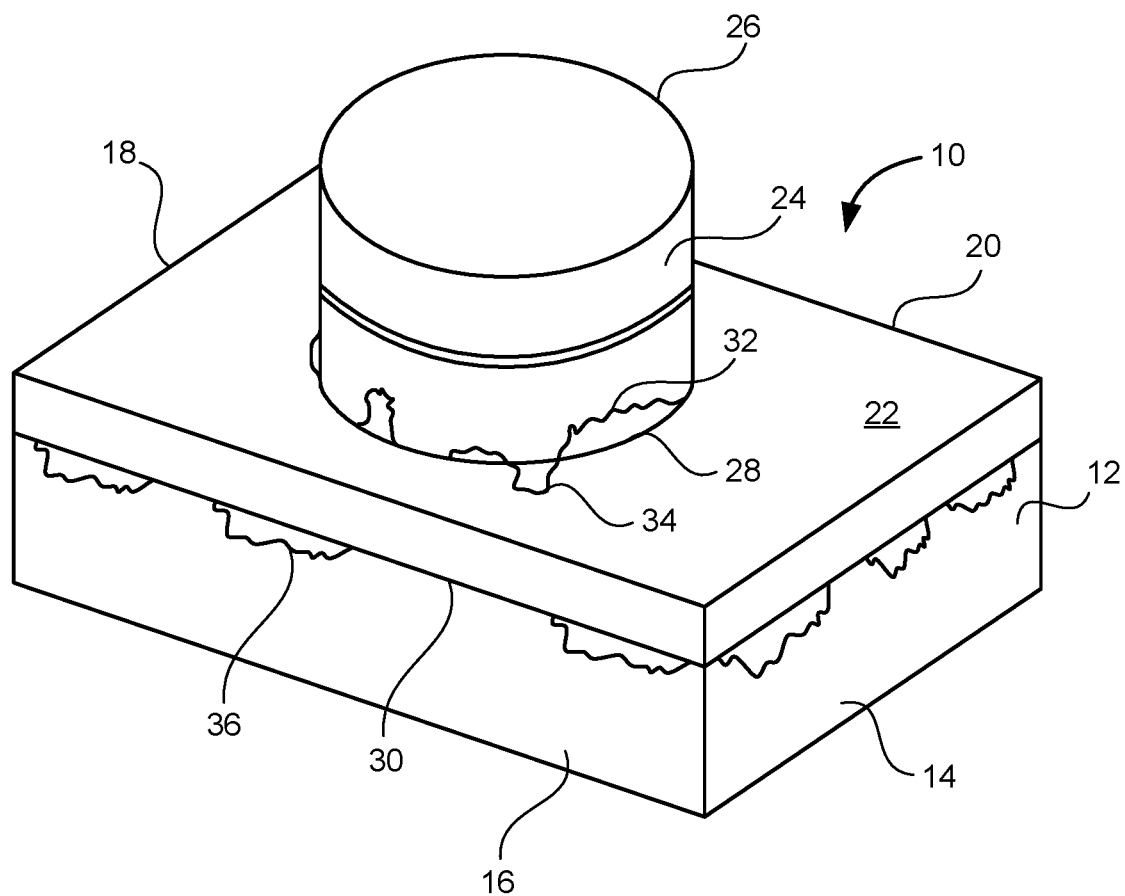
FIG. 1 is a perspective box showing the register box of the present invention.

Referring to FIG. 1, there is shown the insulated register box 10 of the present invention. The register box 10 includes a body 12 having side panels 14, 16, 18 and 20 formed into a generally rectangular configuration. A wall 22 extends across this generally rectangular configuration. A duct 24 is illustrated as affixed to the wall 22 so as to open to the interior of the body 12. The duct 24 includes an open end 26 so as to allow duct 24 to be connected to the HVAC system of a building.

Conventionally, the register box 10 will be formed and pieced together through the use of tack welding. Tack welding is a very efficient manner of forming the register box. Unfortunately, tack welding can often leave gaps and seams in certain areas through which air can penetrate. In particular, the duct 24 can be tack welded to the body 22. Similarly, portions of the body 12 can be tack welded together. As illustrated in FIG. 1, there is a seam 28 that occurs between the duct 24 and the wall 22 of body 12 and also a seam 30 that is located on the side panels 14 and 16.

As will be described hereinafter, an expandable polymeric material, such as polyurethane, is applied for the purposes of insulating the interior of the body 12. In FIG. 1, it can be seen that a portion 32 of the expanded polymeric material actually emerges through the seam 28 so as to reside outwardly on the exterior of the duct 24. Another portion 34 of the expanded polymeric material is illustrated as residing on an exterior surface of the wall 22. Similarly, a portion of the expanded polymeric material 36 extends outwardly through the seam 30 and resides on the exterior of the body 12. This is an important feature of the present invention.

Fundamentally, expanded polyurethane material will expand in an irregular manner. As such, as the polyurethane material expands, it will tend to flow through any pores, gaps, seams and openings. As such, the various portions 32, 34 and 36 of the expanded polymeric material will actually penetrate through the seams. This effectively closes the seams and enhances the air-tightness of the register box 10. Additionally, since this expanded polymeric material can actually be seen on the exterior of the register box, it can be easily viewed by inspectors to see if a register box is insulated or not. To enhance this quality, the expanded polymeric material should be of a different color than the color of the register box. As such, although this seepage of the expanded polymeric material creates an unpleasing and unaesthetic appearance, it facilitates installation and facilitates inspection. Since the register box 10 is typically maintained in an unobservable location, the unpleasing appearance of this seepage is of little or no aesthetic importance.

Figure 2:
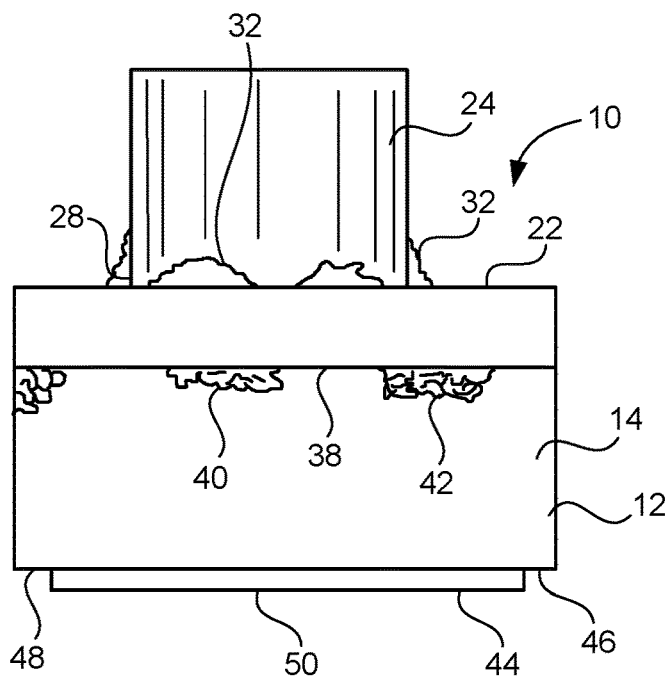
FIG. 2 is a side elevational view of the register box of the present invention.

FIG. 2 shows a side view of the register box 10. As can be seen in FIG. 2, the side panel 14 is particularly illustrated. Side panel 14 includes another seam 38. Portions 40 and 42 of the expanded polymeric material are illustrated as emerging out of the seam 38. Additionally, the duct 24 is illustrated as affixed to and extending outwardly of the wall 22. The portions 32 of the expanded polymeric material are illustrated as extending between through the seam 28 between the duct 24 and the wall 22 and residing on the exterior of the duct 24. In FIG. 2, it can be seen that there is a lip 44 that extends outwardly of the end 46 of the body 12. The lip 44, as will be described hereinafter, extends outwardly of a flange 48. Flange 48 extends inwardly from the side panels 14, 16, 18 and 20 such that the inner edges define an aperture 50 opening to the interior of the body 12.

Figure 3:
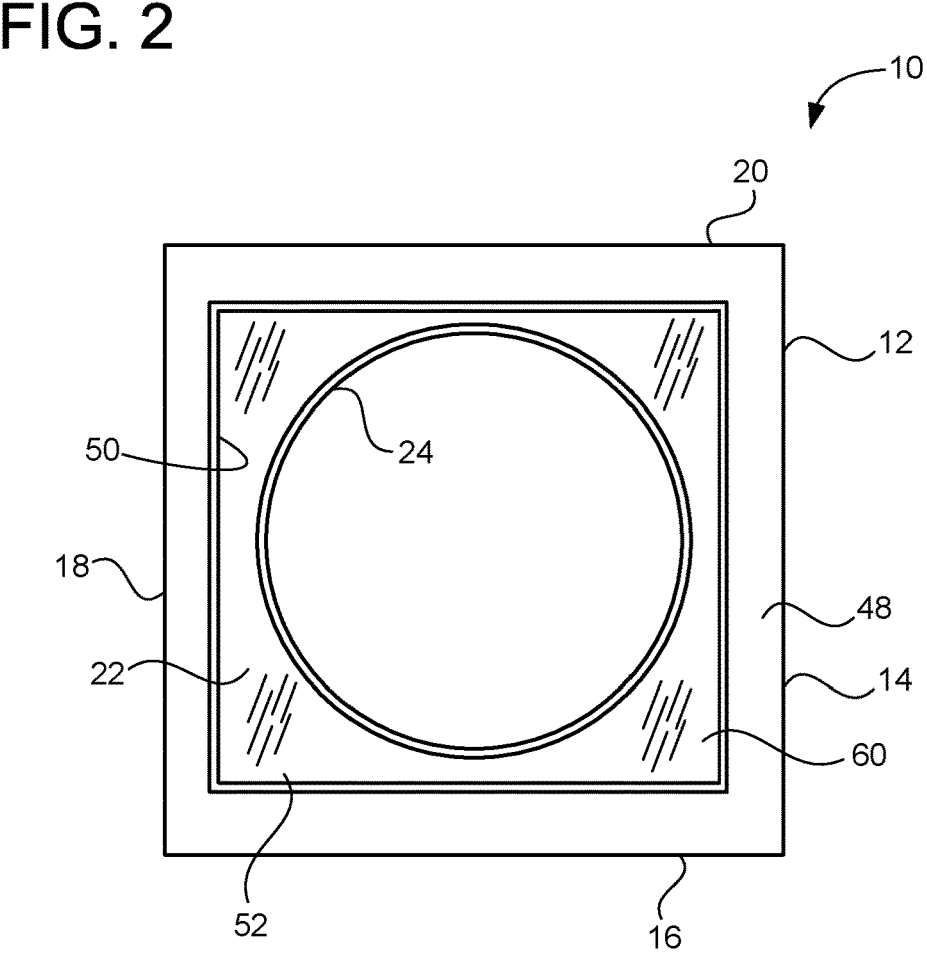
FIG. 3 is a is a bottom view of the register box of the present invention.

FIG. 3 is an end view of the register box 10 of the present invention. In FIG. 3, it can be seen that the duct 24 is affixed to the wall 22. Wall 22 includes a surface 52 that extends from the opening of the duct 24 to the side panels 14, 16, 18 and 20 of the body 12. In FIG. 3, it can be seen that the expanded polymeric material 60 resides over the surface 52 and extends to the side panels 14, 16, 18 and 20. As such, the expanded polymeric material 90 effectively insulates the wall 22 in the area adjacent to the opening of the duct 24.

FIG. 3 further shows the nature of the flanges 48. Flange 48 is illustrated as extending around the interior of the body 12. Flange 48 has a particular width. In accordance with the present invention, and as will be described in association with FIG. 4, the expanded polymeric material 60 will reside against the side panels 14, 16, 18 and 20 and have a thickness approximately equal to the width of the flanges 48. The lip 50 is illustrated as extending in transverse relationship from the flange 48.

Figure 4:
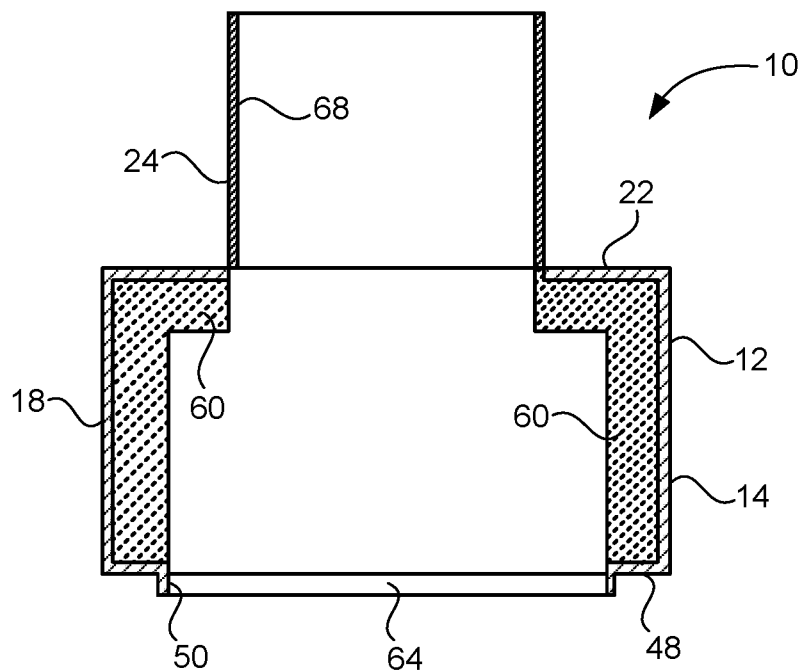
FIG. 4 is a cross-sectional view of the register box of the present invention.

FIG. 4 is a cross-sectional view of the register box 10 of the present invention. As can be seen in FIG. 4, the expanded polymeric material 60 is illustrated as positioned against the side panels 14 and 18. A similar configuration, such as shown in FIG. 4, will occur with respect to the side panels 16 and 20. The expanded polymeric material 60 is illustrated as having a thickness approximately equal to the width dimension of the flange 48. The flange 48, along with the lip 50 defines an aperture 64 that opens to the interior of the body 12. The expanded polymeric material 60 also has a portion 60 that resides against the inner surface of the wall 22. This portion 60 extends from the side panels 14 and 18 so as to generally be aligned with the opening of the duct 24.

In this configuration, the expanded polymeric material 60 can serve as an insulation. This installation is compliant with national building codes, is fire resistant, and also avoids the use of fibrous insulation material. As such, this type of material, since it avoids the fibrous material in the assembly requirements, improves the health and safety of workers that assemble the register box 10. The insulation created by the expanded polymeric material 60 does not require any alterations in the structure of the body 12 or of the duct 24. The insulation material causes the register box 10 to be very energy efficient. Also, since the expanded polymeric material 60 enters and emerges through the various openings, gaps, seams, and holes in the register box 10, it minimizes air loss and improves inspectability.

In FIG. 4, it can be seen that there is no expanded polymeric material located on the inner wall 68 of the duct 24. If any expanded polymeric material would enter the duct 24 or reside on the inner wall 68 of the duct 24, then it could hamper air circulation. As such, it was felt that it was important to block any movement of the expanded polymeric material from entering the area on the interior of the duct 24. Since the expanded polymeric material 60 extends to the aperture 64 that is defined by the lips 50 and the flanges 48, it does not interfere with airflow into the interior of the register box. As such, the present invention remains substantially aerodynamic while, at the same time, improving the insulating qualities required of the register box 10.

Figure 5:
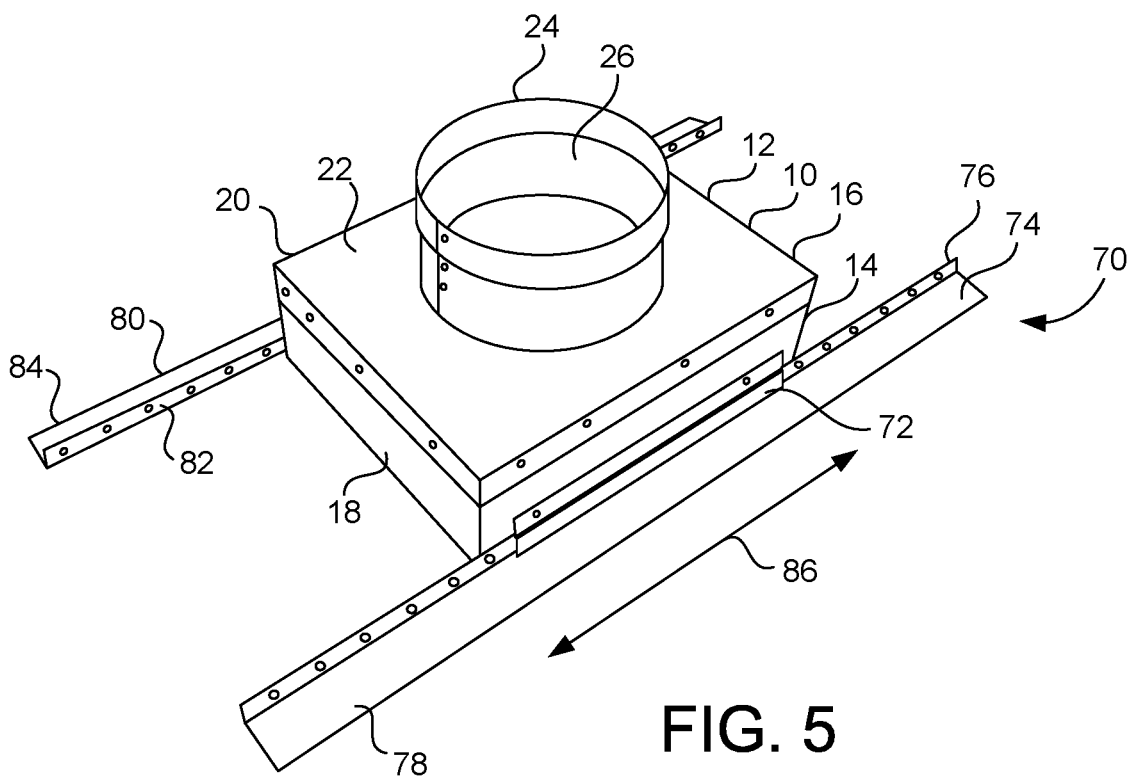
FIG. 5 is a perspective view showing the register box as secured to the boot rail adapter.

FIG. 5 shows the boot rail assembly 70 as secured to the register box 10. In accordance with the teachings of the parent application of U.S. patent application Ser. No. 15/703,436. As described hereinbefore, the register box 10 has a body 12 with side panels 14, 16, 18 and 20. The body 12 is formed into a generally rectangular configuration. The wall 22 extends across this generally rectangular configuration. The duct 24 includes an open end 26 so as to allow the duct 24 to be connected to the HVAC system of the building.

The boot rail assembly 70 includes a guide rail 72 and a rail 74. The rail 74 is illustrated as having a section 76 that extends in transverse relationship to a planar surface 78. The section 76 will be received by the guide rail 72. The guide rail 72 will be affixed to the side panel 14 of the register box 10 without fasteners. In particular, the guide rail 72 is affixed to the side panel 14 through the use of a clinch lock. A clinch lock simply forms the surface of the guide rail 72 with a surface of side panel 14 so as to effectively lock the guide rail 72 to the side panel 14. In this manner, there are no penetrations of the material used for the side panel 14 and no potential damage to the insulation.

There is a second rail 80 positioned in spaced relation to the first rail 74. The register box 10 will also include another guide rail (not shown) that has a similar structure to that of guide rail 72. The section 82 of the second rail 80 will be received within a slot formed in the guide rail that is affixed to wall 20 of the body 12 of register box 10.

As will be described hereinafter, the planar surface 78 of the rail 74 and the planar surface 84 of the second rail 80 will be affixed to a supporting surface. The supporting surface can be in the nature of respective joists. In this configuration, the register box 10 will be positioned between the rails 74 and 80. As such, the register box 10 will be positioned between the joists and extend upwardly therefrom. FIG. 5 has an arrow 86 that shows the slidability of the register box 10 relative to the rails 74 and 80 (and the respective joists to which these rails are connected). As such, the present invention is able to provide proper adjustability of the location of the register box 10.

Figure 6:
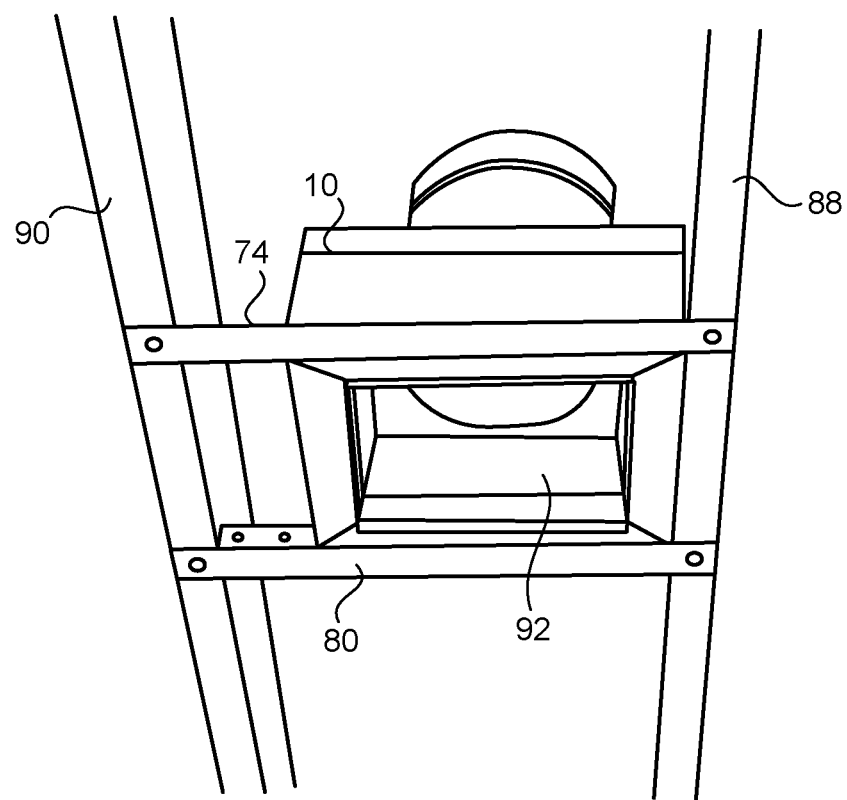
FIG. 6 is a bottom perspective view of the previous embodiment of the present invention showing the installation of the register box with the boot rail adapter to a supporting structure.

FIG. 6 shows the register box 10 as secured between joists 88 and 90. As can be seen, the first rail 74 has one end fastened to the joist 88 and an opposite end fastened to the joist 90. The second rail 80 has one end affixed to the first joist 88 and an opposite end affixed to the second joist 90. The rails 74 and 80 extend in parallel relationship to each other. The register box 10 is illustrated as having an aperture 92 opening at the bottom thereof. The aperture 92 will be located between the rails 74 and 80. This configuration showing that the register box 10 (in relation to the illustration of FIG. 5) can slide in a direction toward the joist 88 and in an opposite direction to the joist 90 so as to provide for proper adjustability between the joists 88 and 90. Alternative mounting could be carried out so as to allow slidability along the joists.

Figure 7:
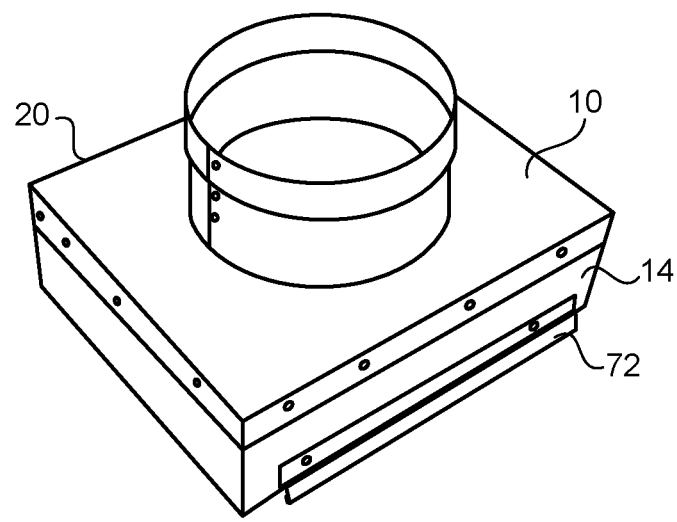
FIG. 7 is a perspective view showing the register box in an initial step of installation in the previous embodiment of the present invention.

FIG. 7 shows an initial step of the method of the present invention. As can be seen in FIG. 7, the guide rail 72 is fastened to side panel 14 of register box 10. Another guide rail (similar to guide rail 72) will be affixed to the side panel 20 of register box 10. The guide rail 72 is located generally adjacent to the bottom of the side panel 10.

Figure 8:
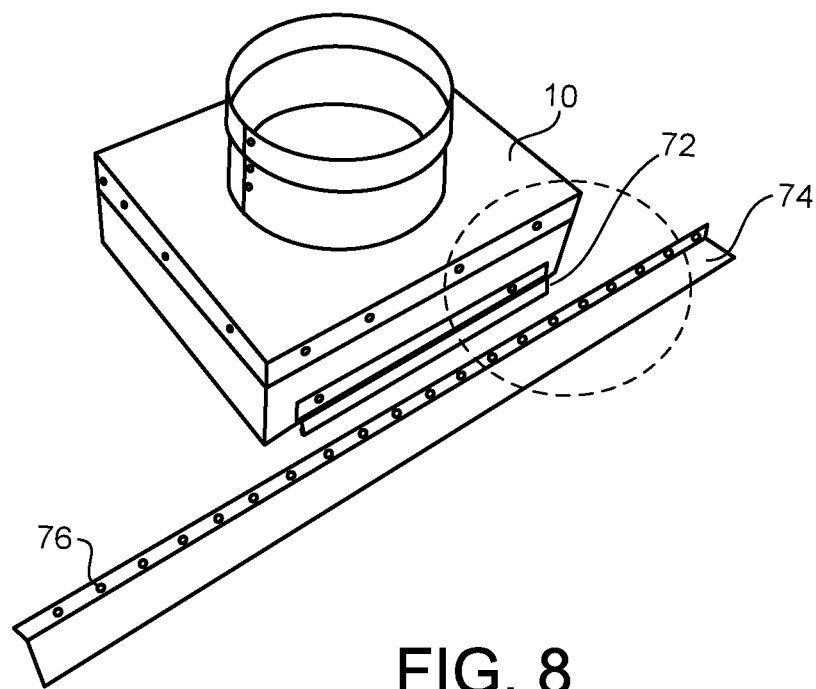
FIG. 8 is an exploded view showing the boot rail assembly of the register box of the previous embodiment of the present invention.

FIG. 8 shows the relationship between the rail 74 and the guide rail 72. As can be seen, the register box 10 is brought into proximity to the upwardly turned section 76 of rail 74. In particular, a worker will cause the guide rail 72 to overlie this upturn section 76 as part of the installation process.

Figure 9:
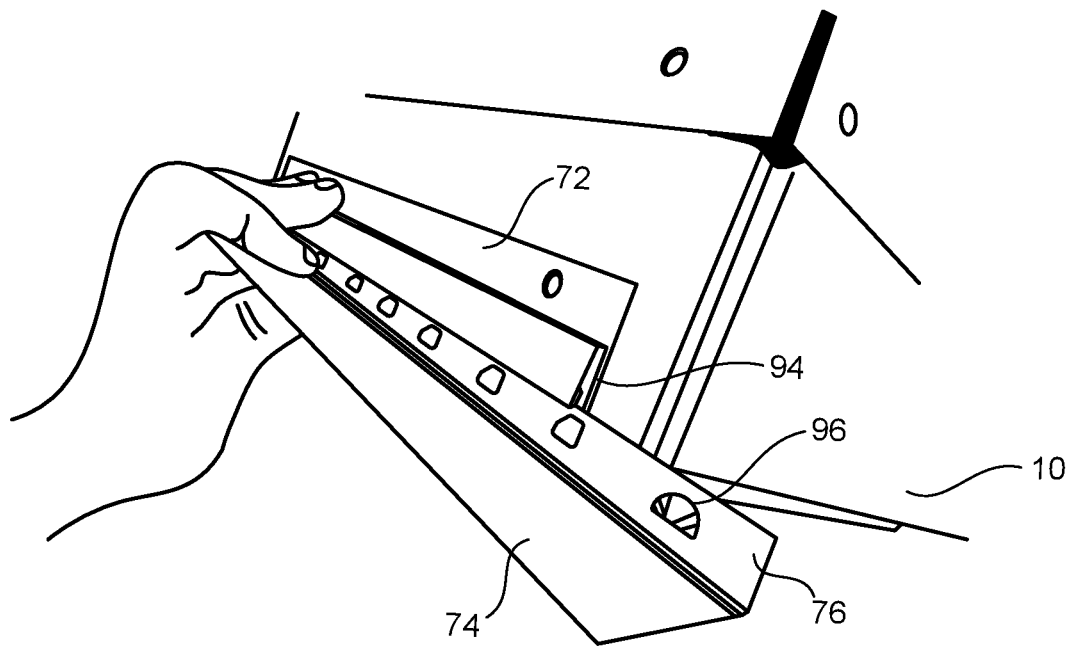
FIG. 9 is a detailed perspective view of the circled area of FIG. 8 showing the securing of the guide rail to the rail in this previous embodiment of the present invention.

FIG. 9 shows a further step in the installation of the register box 10 upon the rail 74. In particular, there is a slot 94 formed in the guide rail 72. Importantly, it can be seen that slot 94 will receive the upturned section 76 of the rail 74. The upturned section 76 will include projections 96 that extend inwardly. As such, when the guide rail 72 receives the upturned section 76 in slot 94, the projections 96 will lock the guide rail 72 to the rail 74. However, the guide rail 72 is free to slide along the rail 74 without interference by the projections 96. The projections 96 serve to resist any lifting forces applied to the register box 10 while allowing sliding forces to move the register box 10 to any location along the rail 74.

Figure 10:
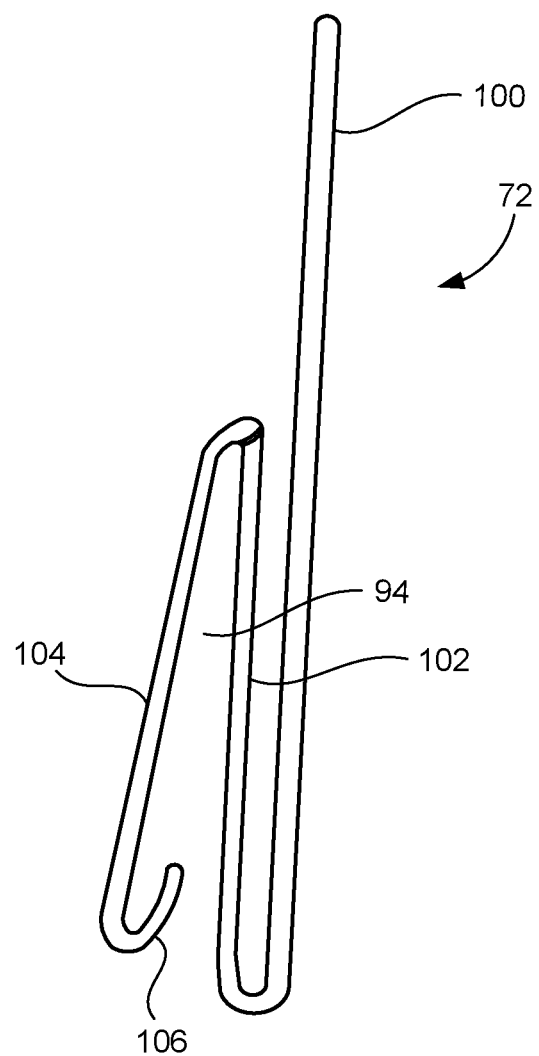
FIG. 10 is an end view of the guide rail of the boot rail assembly of the register box of the previous embodiment of the present invention.

FIG. 10 shows the structure of the guide rail 72. The guide rail 72 has a first surface 100 which bears against the side panel which will be affixed to the exterior surface of the side panel of the register box. In particular, it is affixed without the use of fasteners through the use of a clinch lock. A second surface 102 extends upwardly from the bottom of the first surface 100. A third surface 104 extends downwardly from the upper portion of the second surface 102. There is an upturned edge 106 formed at the bottom of the third surface 104 and which extends inwardly thereof As such, the second surface 102 and the third surface 104 defines the slot 94.

In application, the upwardly extending section 76 of the rail 74 will be inserted into the slot 94 between the second surface 102 and the third surface 104. As such, the projections 96 will reside within the interior of the slot 94. The upturned edge 106 will contact and resist the separation of the guide rail 72 from the rail 74 by virtue of contact with the projections 96. The guide rail 72 can be easily formed in a bending operation. The thin material used for the guide rail 72 enhances the ability to install the register box and to have a minimal weight. Should it be necessary to separate the register box from the joists or from the rails, it is only necessary to apply an outward pulling force to the third surface 104 so as to separate the upturned edge 106 from the respective projections 96.

The insulated register box and boot rail adapter of the present invention allows the register box to be easily installed and positioned. The configuration of the boot trail adapter allows the register box to slide in desired directions and for desired amounts so as to accommodate the ductwork associated with the register box. The structure of the boot rail adapter of the present invention avoids any penetration of the walls of the register box and avoids any damage to the insulating material used in the register box. The boot rail adapter of the present invention allows the box to be locked onto the rail and the exterior surface. As such, this can resist any inadvertent upward forces which could dislodge the register box from its desired position. The boot rail adapter of the present invention, along with the insulated register box, is of a relatively low cost construction. The simplicity of the boot rail adapter of the present invention requires little or no skill or experience in order to properly install the register box in a desired location.

Figure 11:
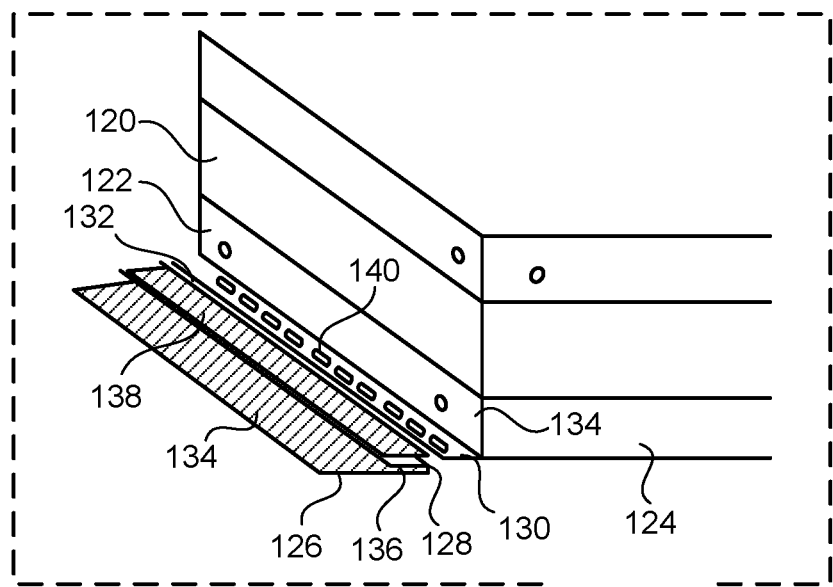
FIG. 11 is a perspective and exploded view showing the relationship of the rail and the rail guide of the present embodiment of the present invention.

After experiments with the register box with the rail adapter of U.S. patent application Ser. No. 15/703,436, it was found that, under certain circumstances, the positioning of the rail and the rail guide could be reversed. This can satisfy certain needs of those it desiring to install the register box of the present invention. In particular, FIG. 11 shows a register box 120 having a plurality of side panels 122 and 124. As with the previous embodiment, a duct will open to the interior of the plurality of side panels 122 and 124. Also, as in the previous embodiment, an insulating material is affixed to the plurality of side panels 122 and 124 and extends inwardly from the side panels. A rail guide 126 defines a slot 128 that extends longitudinally along the rail guide 126. The rail guide is adapted to be affixed to a supporting surface, such as the joists of the previous embodiment. A rail 130 has a section 132 that is received in the slot 128 of the rail guide 126. The rail 130 is affixed to the side panel 122 of the register box 120.

The rail 130 is slidable relative to the rail guide 126. It can be seen that the rail 130 is affixed to an exterior surface of the side panel 122. In particular, as was described hereinbefore, in association with the rail guide, the rail 130 can also be affixed to the exterior surface of the side panel 122 without fasteners, such as through the use of clinch locks.

In particular, the rail 130 is affixed to the register box 120 in a similar manner to that of the previous embodiment in which the rail guide is actually affixed to the register box. The rail 130 can include a first rail (shown in FIG. 11) that is affixed to the side panel 122 and a second rail (not shown) that is affixed to an opposite side panel of the register box 120. As with the previous embodiment, the rail guide 126 can include a first rail guide and a second rail guide. It can be seen that the first rail guide 126 receives the first rail 130. Another rail guide located on the opposite side of the register box 120 will receive the second rail therein. The rail 130 includes a surface 134 that is affixed to the side panel 122 and a second surface, such as section 132, that extends transversely outwardly of the first surface 134.

The rail guide 126 includes a first surface 134 that is adapted to be affixed to the underlying surface. The rail guide 126 also includes a second surface 136 that extends inwardly from a side of the first surface 134. A third surface 138 extends in spaced generally parallel relationship to the second surface 136. The third surface 138 will include an inwardly turned edge (similar to that of the previous embodiment as shown in FIG. 10). The slot 128 of the rail guide 126 is defined by the second surface 136 and the third surface 138. The section 132 of the rail 130 is received between the second surface 136 and the third surface 138.

The rail 130 includes a plurality of projections 140 that extend outwardly of the section 132. The projection 140 is cooperative with the inwardly turned edge of the third surface 138 of the rail guide 126 so as to lock the rail guide 126 to the rail 130.

Figure 12:
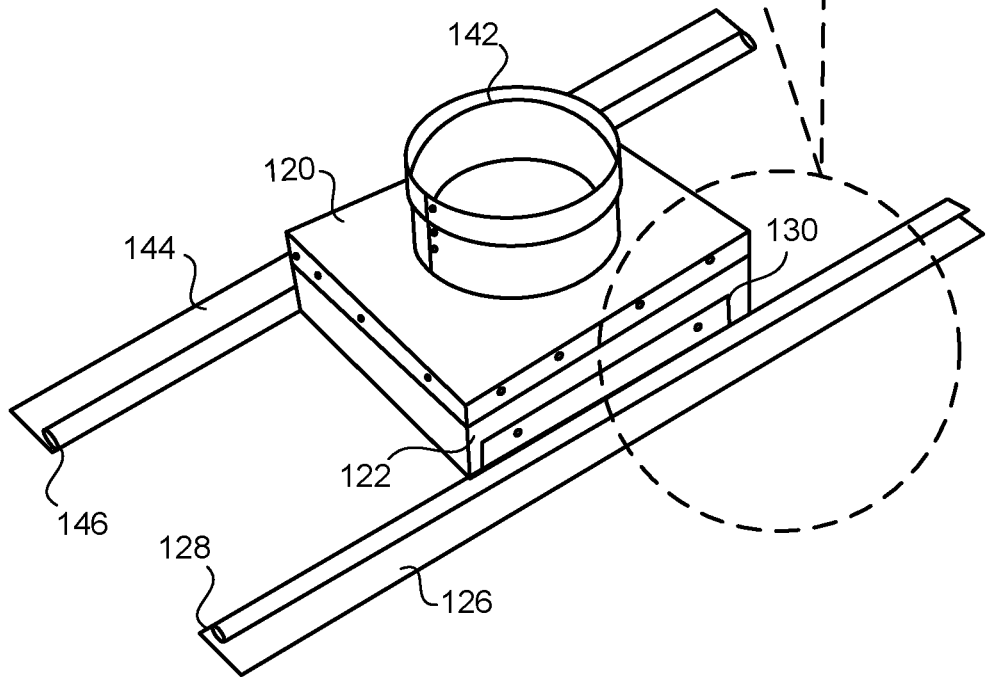
FIG. 12 is a perspective view showing the securing of the register box to the pair of guide rails in accordance with the present invention.

FIG. 12 shows the register box 120 having the duct 142 opening to an interior of the register box 120. FIG. 12 shows that there is a first rail guide 126 and a second rail guide 144 positioned on opposite sides of the register box 120. The register box 120 has the rail 130 affixed to the side panel 122. In the manner shown in FIG. 11, the first rail 130 engages the slot 128 of the rail guide 126. A similar rail, located on the opposite side of the register box 120, will engage with the slot 146 of the second rail guide 144.

The rail guides 126 and 144 are adapted to be affixed to an exterior surface. With reference to FIG. 6, the rail guides 126 and 144 can be secured to the joists 88 and 90. As such, the rail guides 126 and 144 can be affixed in the same manner that the rails 74 and 80 were affixed to the joists 88 and 90 of FIG. 6. This arrangement will support the register box 120 in a location between the joists 88 and 90. The slidable relationship between the rail 130 and the rail guide 126 allows the register box to be suitably adjusted between the joists 88 and 90.

In the method of the present invention, with reference to FIGS. 11 and 12, the rail 130 is affixed to the exterior surface of the register box 120. The section 132 of the rail 130 is inserted into the slot 128 of the rail guide 126 such that the rail 130 is secured to the rail guide 126. The rail guide 126 can be fastened to a supporting surface such that the register box 120 extends away from the supporting surface. The method of the present invention allows the section 132 of the rail 130 to slide longitudinally along the slot 128 of the rail guide 126 so as to position the register box in a desired position with respect to the supporting surface. The rail 130 is affixed to the exterior surface of the register box 120 without penetrating the material of the register box 120. This can be accomplished through the use of a clinch lock.

The step of fastening includes affixing the rail guide 126 to a joist such that the register box 120 is positioned between the first joist 88 and the second joist 90 (as shown in FIG. 6). The first rail guide 126 is affixed to the first and second joist 88 and 90 such that the first rail guide 126 extends between the first and second joists 88 and 90. The second rail guide 144 is affixed to the first and second joists 88 and 90 such that the second rail guide 144 extends between the first and second joists 88 and 90 in parallel relationship to the first rail guide 126. The section 132 of the rail 130 is snap-fit into the slot 128 of the rail guide 126 that such that the rail guide 126 is locked upon the rail 130.

The foregoing disclosure and description of the invention is illustrative and explanatory thereof. Various changes in the details of the illustrated construction and in the steps of the described method can be made within the scope of the present claims without departing from the true spirit of the invention. The present invention should only be limited by the following claims and their legal equivalents.

I claim:

1. An apparatus comprising:
    a register box having a plurality of side panels and a duct opening to an interior of said plurality of side panels;
    an insulating material affixed to said plurality of side panels and extending inwardly of said plurality of side panels;
    a first rail guide defining a slot that extends longitudinally along said first rail guide, said first rail guide adapted to be affixed to a supporting surface;
    a second rail guide defining a slot that extends longitudinally along said second rail guide, said second rail guide adapted to be affixed to another supporting surface;
    a first rail having a section received in the slot of said first rail guide, said first rail affixed to one side panel of the plurality of side panels of said register box, said first rail extending longitudinally along only the one side panel of the plurality of side panels, said first rail being slidable relative to said first rail guide, said first rail being affixed to an exterior surface of the one side panel of the plurality of side panels of said register box by a clinch lock without the use of fasteners and without penetrating a material of the plurality of side panels; and
    a second rail having a section received in the slot of said second guide rail, said second rail affixed to a side panel opposite to the one side panel of the plurality of side panels of said register box, said second rail extending longitudinally along only the side panel opposite to the one side panel of the plurality of side panels of said register box, said second rail being slidable relative to said second rail guide, said first rail having a first surface affixed to the one side panel and a second surface extending transversely outwardly of the first surface, said first rail guide comprising a first surface adapted to be affixed to the supporting surface, a second surface extending inwardly from a side of said first surface, and a third surface extending in spaced relationship to said second surface on a side of said second surface opposite said first surface, said third surface having an inwardly turned edge, said slot of said first rail guide defined by said second and third surfaces, said section of said first rail being received between said second and third surfaces, said section of said first rail having at least one projection extending toward said third surface of said first rail guide, said projection cooperative with said inwardly turned edge so as to lock said first rail guide to said first rail.

* * * * *